United States Patent
Nishida et al.

(10) Patent No.: US 8,477,999 B2
(45) Date of Patent: Jul. 2, 2013

(54) ROAD DIVISION LINE DETECTOR

(75) Inventors: Makoto Nishida, Brussels (BE); Isamu Takai, Aichi-gun (JP)

(73) Assignees: Toyota Jidosha Kabushiki Kaisha, Toyota-shi (JP); Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 1349 days.

(21) Appl. No.: 12/280,435

(22) PCT Filed: Mar. 22, 2007

(86) PCT No.: PCT/JP2007/055881
§ 371 (c)(1),
(2), (4) Date: Aug. 22, 2008

(87) PCT Pub. No.: WO2007/111220
PCT Pub. Date: Oct. 4, 2007

(65) Prior Publication Data
US 2009/0034799 A1 Feb. 5, 2009

(30) Foreign Application Priority Data
Mar. 24, 2006 (JP) .................................. 2006-082812

(51) Int. Cl.
*G06K 9/00* (2006.01)
*G06K 9/46* (2006.01)
*G06K 9/66* (2006.01)
*G06K 9/48* (2006.01)

(52) U.S. Cl.
USPC ........... 382/104; 382/103; 382/190; 382/192; 382/199

(58) Field of Classification Search
None
See application file for complete search history.

(56) References Cited

U.S. PATENT DOCUMENTS 5,987,174 A * 11/1999 Nakamura et al. ............ 382/199
5,999,635 A * 12/1999 Higashikubo et al. ........ 382/104

(Continued)

FOREIGN PATENT DOCUMENTS

| JP | 4 152406 | 5/1992 |
| JP | 8 320998 | 12/1996 |

(Continued)

OTHER PUBLICATIONS

Machine translation of JP2003-337997.*

*Primary Examiner* — Tom Y Lu
*Assistant Examiner* — Thomas Conway
(74) *Attorney, Agent, or Firm* — Oblon, Spivak, McClelland, Maier & Neustadt, L.L.P.

(57) ABSTRACT

The present invention relates to a lane-dividing line detection device and has an object of detecting a lane-dividing line with high accuracy by accurately extracting characteristic points of the lane-dividing line while responding flexibly to road surface conditions. According to the present invention, pixel parts where a brightness variation is larger than a predetermined threshold are extracted from an image picked up by a camera that picks up an area ahead of a vehicle as edge points representing the lane-dividing line on a road surface (step 106). Next, candidates for the lane-dividing line drawn on a road are generated based on the extracted edge points (step 108). Then, the predetermined threshold for the brightness variation used to extract the edge points is changed based on the number of the generated candidates for the lane-dividing line (steps 122 through 130). Specifically, if the number of the candidate lines exceeds a predetermined number, the threshold is changed to a high value so as to increase difficulty in extracting the edge points. On the other hand, if the number of the candidate lines does not reach the predetermined number, the threshold is changed to a low value so as to facilitate the extraction of the edge points.

19 Claims, 3 Drawing Sheets

U.S. PATENT DOCUMENTS

| | | | |
|---|---|---|---|
| 6,163,022 A * | 12/2000 | Yasui et al. | 250/208.1 |
| 6,493,458 B2 * | 12/2002 | Yasui et al. | 382/104 |
| 6,546,118 B1 * | 4/2003 | Iisaka et al. | 382/104 |
| 6,813,383 B1 * | 11/2004 | Sakurai | 382/202 |
| 6,829,388 B1 * | 12/2004 | Sakurai | 382/199 |
| 7,079,668 B2 * | 7/2006 | Kogure et al. | 382/104 |
| 7,307,545 B2 * | 12/2007 | Nishida | 340/901 |
| 7,379,815 B2 * | 5/2008 | Kobayashi et al. | 701/300 |
| 7,668,341 B2 * | 2/2010 | Miyajima et al. | 382/104 |
| 7,937,196 B2 * | 5/2011 | Watanabe et al. | 701/23 |
| 2002/0061123 A1 * | 5/2002 | Akutagawa | 382/104 |
| 2002/0080019 A1 * | 6/2002 | Satoh et al. | 340/436 |
| 2002/0080235 A1 * | 6/2002 | Jeon | 348/116 |
| 2003/0103649 A1 * | 6/2003 | Shimakage | 382/104 |
| 2003/0103650 A1 * | 6/2003 | Otsuka et al. | 382/104 |
| 2004/0080449 A1 * | 4/2004 | Horibe | 342/70 |
| 2006/0239509 A1 * | 10/2006 | Saito | 382/104 |
| 2007/0233386 A1 * | 10/2007 | Saito et al. | 701/300 |

FOREIGN PATENT DOCUMENTS

| | | |
|---|---|---|
| JP | 2861638 | 12/1998 |
| JP | 11 205663 | 7/1999 |
| JP | 2003 337997 | 11/2003 |
| JP | 2004 246798 | 9/2004 |
| JP | 2005 157723 | 6/2005 |

* cited by examiner (A) EXTRACTION OF EDGE POINTS (B) GENERATION OF CANDIDATES FOR LANES (C) EXTRACTION OF EDGE POINTS ● : EDGE POINTS REPRESENTING ACTUAL LANE-DIVIDING LINES
▲ : EDGE POINTS CAUSED BY NOISE (A) COMPOSITE LINE (B) SINGLE LINE

ROAD DIVISION LINE DETECTOR

TECHNICAL FIELD

The present invention relates to lane-dividing line detection devices and, in particular, to a lane-dividing line detection device that is installed in a vehicle and detects a lane-dividing line drawn on a road surface based on an image picked up by pickup means for picking up the road surface around the vehicle.

BACKGROUND ART

A known lane-dividing line detection device detects a lane-dividing line such as a white line drawn on a road to divide lanes where vehicles run (see, for example, Patent Document 1). The device includes a camera that is installed in its own vehicle and picks up an area ahead of the vehicle and processes an image picked up by the camera to detect the lane-dividing line. Specifically, the device extracts plural parts where brightness is equal to or larger than a reference threshold as characteristic points of the lane-dividing line from the image including the lane-dividing line such as a white line and connects the plural characteristic points together with a line to set candidate lines having a large number of the characteristic points for the lane-dividing line.

Patent Document 1: JP-B2-2861638

DISCLOSURE OF INVENTION

Problems to be Solved by the Invention

However, if the reference threshold for brightness as a parameter for extracting the characteristic points of the lane-dividing line is fixed to a certain value, there is a likelihood of causing much noise to be included in the parts extracted as the characteristic points of the lane-dividing line from the image. As a result, the false detection of the lane-dividing line is easily caused. In addition, there is a likelihood of causing the parts that must be normally extracted as the characteristic points of the lane-dividing line not to be extracted as the characteristic points due, for example, to the fact that the paint of a lane-dividing line drawn on a road surface is peeled and scraped. As a result, the detection of the lane-dividing line may become difficult.

The present invention has been made in view of the above points and has an object of providing a lane-dividing line detection device capable of detecting a lane-dividing line with high accuracy by accurately detecting characteristic points of the lane-dividing line while responding flexibly to road surface conditions.

Means for Solving the Problems

In order to attain the above object, there is provided a lane-dividing line detection device that has pickup means for picking up a road surface around a vehicle and characteristic point extraction means for extracting a part where a predetermined parameter meets a reference from an image picked up by the pickup means as a characteristic point representing a lane-dividing line on the road surface and detects the lane-dividing line drawn on a road based on the characteristic point extracted by the characteristic point extraction means. The lane-dividing line detection device comprises candidate line generation means for generating a candidate line for the lane-dividing line based on the characteristic points extracted by the characteristic point extraction means; and reference change means for changing the reference on the predetermined parameter used when the characteristic point extraction means extracts the characteristic points from the image based on the number of the candidate lines generated by the candidate line generation means.

According to an embodiment of the present invention, after parts where the predetermined parameter meets the reference are extracted as the characteristic points representing the lane-dividing line, the candidate lines for the lane-dividing line are generated based on the extracted characteristic points. Generally, a predetermined number of the lane-dividing lines (typically one lane-dividing line) exist (exists) on both sides of the road. In this regard, if the number of the generated candidate lines for the lane-dividing line on one side of the road exceeds the predetermined number, the candidate lines represent the predetermined number of actual lane-dividing lines and other lines caused by noise. Thus, it can be determined that noise is easily extracted as the characteristic points of the lane-diving line. On the other hand, if the number of the generated candidate lines for the lane-dividing line does not reach the predetermined number on the one side of the road, it can be determined that the extraction of the characteristic points becomes difficult due, for example, to the fact that the paint of the actual lane-dividing line drawn on the road surface is peeled.

In the present invention, the reference for the predetermined parameter used to extract the characteristic points of the lane-dividing line from the image is changed based on the number of the generated candidate lines.

With this configuration, it is possible to prevent the noise from being extracted as the characteristic points of the lane-dividing line. Also, it is possible to prevent the difficulty of extracting the characteristic points from the lane-dividing line drawn on the road surface. According to the present invention, the characteristic points of the lane-dividing line can be thus extracted while responding flexibly to road surface conditions, thereby making it possible to detect the lane-dividing line with high accuracy.

Note that "the number of the candidate lines" represents a concept including the "presence or absence of the candidate line" in the present invention.

Meanwhile, in the lane-dividing line detection device, the reference change means may change the reference so as to facilitate the extraction of the characteristic points when the number of the candidate lines generated by the candidate line generation means does not reach a predetermined number.

Furthermore, in the lane-dividing line detection device, the reference change means may change the reference so as to increase difficulty in extracting the characteristic points when the number of the candidate lines generated by the candidate line generation means exceeds a predetermined number.

Moreover, in the lane-dividing line detection device, the reference change means may change the reference so as to facilitate the extraction of the characteristic points when the number of the candidate lines generated by the candidate line generation means does not reach a predetermined number and may change the reference so as to increase difficulty in extracting the characteristic points when the number of the candidate lines generated by the candidate line generation means exceeds the predetermined number.

Furthermore, in the lane-dividing line detection device, if the reference is changed stepwise by a predetermined unit, the reference change means can converge the reference for extracting the characteristic points of the lane-dividing line from the image into a proper one carefully responding to road surface conditions such as the degree of the noise and the degree of paint scraped of an actual lane-dividing line. Therefore, it is possible to detect the lane-dividing line with further high accuracy.

In this case, if the time variation of the number of the characteristic points extracted by the characteristic point extraction means is equal to or larger than a predetermined value, the reference change means changes the reference over the predetermined unit at a stroke. Accordingly, even when the brightness of a road surface is suddenly changed, for example, at the entrance and exit of a tunnel, it is possible to prevent long-term continuation of not detecting the lane-dividing line and extracting unnecessary noise. Thus, it is possible to prevent the detection accuracy of the lane-dividing line from being degraded.

Meanwhile, with the provision of the predetermined number change means for changing the predetermined number in accordance with the number of the lane-dividing lines drawn on one side of the road, the lane-dividing line detection device can extract the characteristic points of the lane-dividing line while responding flexibly to road surface conditions even when the number of the lane-dividing lines drawn on the one side of the road is changed with time, i.e., when the lane-dividing line is changed from a single line to a composite line and vise versa. Therefore, it is possible to detect the lane-dividing line with further high accuracy.

In this case, the predetermined number change means may increase the predetermined number when the shape of the lane-dividing line drawn on the one side of the road is changed from a single line composed of one line to the composite line composed of plural lines.

Moreover, the lane-dividing line detection device changes the reference on the predetermined parameter used when the characteristic point extraction means extracts the characteristic points from the image at next and subsequent times. Accordingly, it is possible to reduce the calculation cost and processing amount for detecting the lane-dividing line from one image.

In the lane-dividing line detection device, the predetermined parameter may represent brightness or a brightness variation.

Advantage of the Invention

According to the present invention, it is possible to detect a lane-dividing line with high accuracy by accurately detecting characteristic points of the lane-dividing line while responding flexibly to road surface conditions.

EXPLANATION FOR REFERENCE NUMBER 10 lane-dividing line detection device
12 camera
14 image processing unit
SH threshold
COUNT the number of candidates for a lane-dividing line

BEST MODE FOR CARRYING OUT THE INVENTION

Next, a description is made of a preferred embodiment of the present invention.

Figure 1:
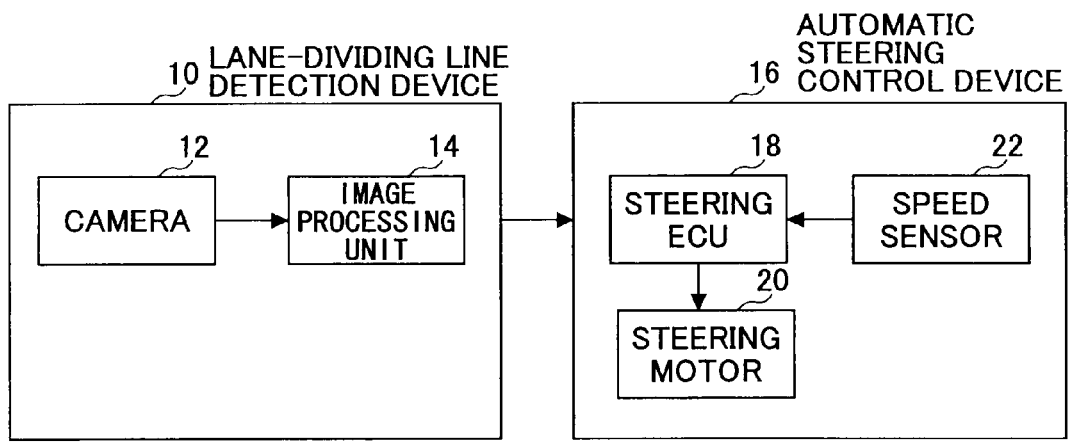
FIG. 1 shows a configuration diagram of a system including a lane-dividing line detection device as an embodiment of the present invention.

FIG. 1 shows a configuration diagram of a system including a lane-dividing line detection device 10 installed in a vehicle as an embodiment of the present invention. The lane-dividing line detection device 10 of this embodiment includes a camera 12 and an image processing unit 14. The camera 12 is disposed in a bumper and a grill at a front part of a vehicle body or a stay of an inner mirror of the front part inside the vehicle. The camera 12 is, for example, a CCD camera that has an optical axis oriented in a traveling direction ahead of the vehicle and picks up an area ahead of the vehicle.

The camera 12 is connected to the image processing unit 14. An image picked up by the camera 12 is supplied to the image processing unit 14 as a video signal. As described in detail below, the image processing unit 14 detects and presumes a lane-dividing line such as a solid or dashed white line or yellow line drawn on a road to divide lanes where vehicles run based on the video signal supplied from the camera 12. Then, the lane-dividing line detection device 10 calculates the lateral position of its own vehicle relative to the lane-dividing line detected and presumed by the image processing unit 14.

The system of this embodiment includes an automatic steering control device 16 connected to the lane-dividing line detection device 10. The automatic steering control device 16 includes an electronic control unit (hereinafter referred to as a steering ECU) 18. The steering ECU 18 is connected to a steering motor 20 and a speed sensor 22. The steering motor 20 produces a torque for steering the vehicle in accordance with a command signal supplied from the steering ECU 18. The speed sensor 22 outputs a signal corresponding to the speed of the vehicle. The steering ECU 18 detects the speed of the vehicle based on the output signal from the speed sensor 22. Furthermore, information on the lateral positions of the vehicle calculated by the lane-dividing line detection device 10 is supplied to the steering ECU 18. For example, if the own vehicle is about to deviate from the lane-dividing line at the lateral position, the steering ECU 18 supplies the command signal to the steering motor 20 to effect the automatic steering of the vehicle in accordance with its speed so as to prevent the vehicle from deviating from the lane-dividing line (deviation preventing control).

Here, a description is be made of operations of the lane-dividing line detection device 10 of this embodiment.

In the lane-dividing line detection device 10 of this embodiment, the image processing unit 14 regularly acquires an image picked up by the camera 12. Because a road is generally paved with asphalt, it is reflected in the acquired image in colors (mainly in black) having low brightness (luminance). On the other hand, because a lane-dividing line such as a white line drawn on the road has relatively high brightness, it is reflected in the acquired image in colors (such as white and yellow) having high brightness. Accordingly, it is possible to extract a target constituting the lane-dividing line such as a white line from the image using a brightness variation between the road and the target constituting the lane-dividing line.

Every time the image processing unit 14 acquires one frame of the image from the camera 12, it laterally scans the one frame of the image as a whole at a predetermined interval and determines for each pixel whether the brightness variation (contrast) is larger than a predetermined threshold. Then, pixel parts having a large brightness variation are extracted as edge points from the acquired one frame of the image. Note that the extraction of the edge points is suitable for reducing processing time if it is applied only to an area where the target constituting the lane-dividing line is likely to exist in the entire image. However, the same effect can be obtained even if only the area where the target constituting the lane-dividing line is likely to exist is filtered after the edge points are extracted from the entire image.

After the extraction of the edge points from the one frame of the image, the image processing unit 14 attempts to connect all the extracted edge points having the large brightness variation together with a line, thereby generating linear edge lines as candidates for the lane-dividing line.

If the target constituting the lane-dividing line is a solid line, the edge points extracted from the one frame of the image appear along the lane-dividing line having nearly no gap between them. Furthermore, if the target constituting the lane-dividing line is a dashed line, the edge points extracted from the one frame of the image may appear having a gap between them because there are missing parts (parts that do not form the line) in the dashed line. In this case, however, the edge points appear along the lane-dividing line so as to cover the missing parts by connecting line-forming parts of the dashed line together. Accordingly, as a result of connecting the edge points extracted from the one frame of the image together as described above, the image processing unit 14 first performs line detection for detecting lines having a predetermined number or more edge points per unit distance on both right and left sides in the image. Then, if the above lines are detected by the line detection, they are held as the candidates for the lane-dividing line.

Furthermore, because the target constituting the lane-dividing line such as a white line drawn on the road has a certain thickness (width), each lane-dividing line necessarily includes a pair of edge points making a pair at its left and right edges between which the brightness variation is large. Accordingly, following the line detection, the image processing unit 14 performs a pair determination for determining whether a pair of the edge points exists in the respective lines having the predetermined number or more edge points per unit distance detected through the line detection. Then, the line that does not have the pair of edge points is excluded from the candidates for the lane-dividing line, while the line that have the pair of edge points is held as a candidate for the lane-dividing line.

Moreover, because the target constituting the lane-dividing line such as a white line is continuously drawn on the road, the position of the target reflected in the image is not largely changed during consecutive frames. On the other hand, because road surface noise does not continuously appear on the road, the position of the noise reflected in the image is largely changed (the noise suddenly appears) during the consecutive frames. Accordingly, following the pair determination on the one frame of the image, the image processing unit 14 performs a continuity determination for determining a pair of lines having positional continuity during the past frame and the present frame based on the relationship between the positions (particularly right and left positions) of the pair of lines determined to have the pair of edge points through the pair determination in the image and the positions of the lane-dividing lines detected in the past (immediately preceding) frame in the image. Then, the pair of lines discontinuous with the past lane-dividing lines in the image is excluded from the candidates for the lane-dividing line, while the pair of lines continuous with the past lane-dividing lines in the image is held as candidates for the lane-dividing line.

The image processing unit 14 generates the pair of lines determined to have the positional continuity through the continuity determination as the edge lines that are the candidates for the lane-dividing line. Then, the image processing unit 14 detects and presumes the edge line having the predetermined number or more edge points as the lane-dividing line on the road and calculates the lateral position of its own vehicle relative to the lane-dividing line.

Figure 2:
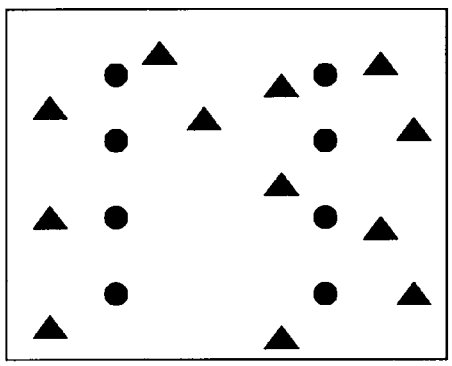
FIGS. 2A through 2C explain situations generated when edge points having a large brightness variation are extracted from one frame of an image.
Figure 2:
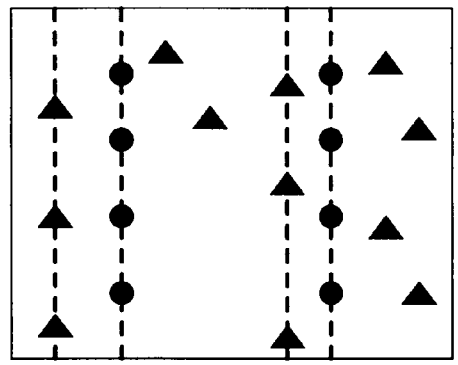
Figure 2:
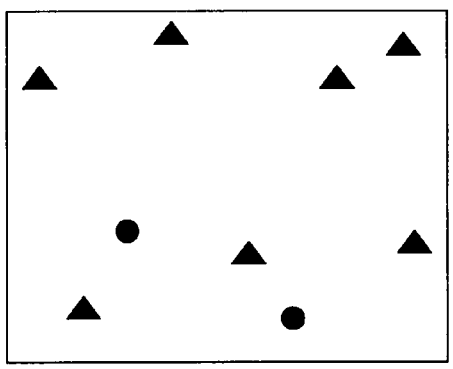

FIGS. 2A through 2C explain situations generated when the edge points having a large brightness variation are extracted from one frame of the image. Note that FIGS. 2A through 2C show the situations of images picked up by the camera as viewed vertically from immediately above the road surface. Furthermore, in FIGS. 2A through 2C, black circle marks are the edge points representing the actual lane-dividing line, while black triangle marks are the edge points caused by noise.

Meanwhile, if the threshold for the brightness variation to detect the edge points from the image picked up by the camera 12 is fixed to a certain value, there is a likelihood of causing a large amount of noise components to be included in the pixel parts extracted from the image as the edge points (FIG. 2A), and plural edge lines may be generated as candidates for the lane-dividing line (FIG. 2B). As a result, the false detection of the lane-dividing line is easily caused. In addition, there is a likelihood of causing the pixel parts that must be generally extracted as the edge points not to be extracted as the edge points due, for example, to the fact that paint of the lane-dividing line drawn on the road surface is peeled (FIG. 2C). As a result, the detection of the lane-dividing line may become difficult.

Figure 3:
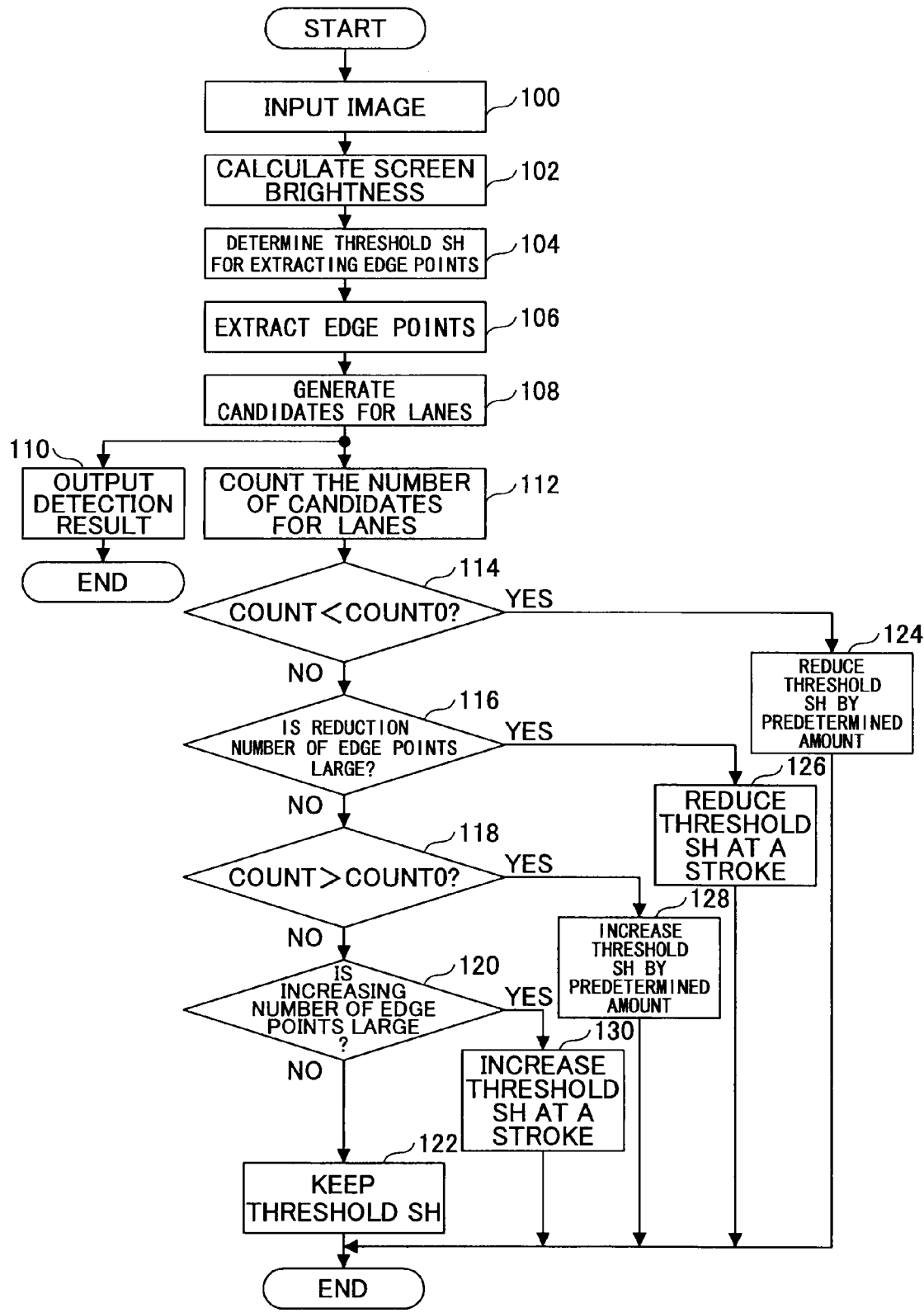
FIG. 3 shows a flowchart of an example of a control routine executed in the lane-dividing line detection device of this embodiment.

Accordingly, the lane-dividing line detection device 10 of this embodiment has a first characteristic in that it detects the lane-dividing line with high accuracy by accurately extracting the edge points from the one frame of the image while responding flexibly to road surface conditions. Referring to FIG. 3, a description is now made of a first characteristic part of this embodiment.

Generally, a predetermined number of lane-dividing lines (typically one lane-dividing line) such as a white line are generally drawn on both sides of the road surface where vehicles run. Therefore, if the number of the candidate lines (edge lines) for the lane-dividing line generated based on the edge points extracted from the image picked up by the camera exceeds the predetermined number on one side of the lane, it can be determined that the candidate lines represent the predetermined number of actual lane-dividing lines drawn on the road and other lines caused by noise where the brightness variation is not so large. Furthermore, if the number of the candidate lines (edge lines) for the lane-dividing line generated based on the edge points extracted from the image picked up by the camera does not reach the predetermined number on one side of the lane, it can be determined that the extraction of the edge points becomes difficult due, for example, to the fact that paint of the actual lane-dividing line drawn on the road is peeled and scraped.

According to this embodiment, the edge points are extracted from the image picked up by the camera for each pixel based on the determination whether the brightness variation is larger than the predetermined threshold. That is, the pixel parts having a relatively large brightness variation are extracted as the edge points. In this regard, if the number of the candidate lines for the lane-dividing line actually generated through the line detection, pair determination, and continuity determination based on the edge points extracted from the image picked up by the camera exceeds the predetermined number (typically one), the predetermined threshold for the brightness variation used to extract the edge points is changed to a high value so as to prevent noise from being extracted as the edge points, thereby eliminating the likelihood of extracting the noise which does not represent the actual lane-dividing line as the edge points of the lane-dividing line as much as possible. Furthermore, if the number of the candidate lines for the lane-dividing line actually generated based on the edge points extracted from the image picked up by the camera does not reach the predetermined number, the predetermined threshold is changed to a low value so as to facilitate the extraction of the target representing the actual lane-dividing line as the edge point, thereby eliminating the likelihood of causing the target representing the actual lane-dividing line not to be extracted as the edge line as much as possible.

FIG. 3 shows a flowchart of an example of a control routine executed by the image processing unit 14 in the lane-dividing line detection device 10 of this embodiment so as to realize the above function. The routine shown in FIG. 3 is repeatedly activated every predetermined time in which the image picked up by the camera 12 is input. When the routine shown in FIG. 3 is activated, the process of step 100 is first executed.

In step 100, the process is executed to input the image that is picked up by the camera 12 and is output as a video signal. In step 102, the screen luminance (brightness) of the image input in step 100 is calculated.

In step 104, a process is executed to set the predetermined threshold SH for the brightness variation used to extract the edge points of the target constituting the lane-dividing line from the image picked up by the camera 12. The threshold SH may be such that its initial value (for example, the value at the time of starting the vehicle) is previously set to a general value (for example, the prescribed lower limit) with which the target constituting the actual lane-dividing line can be extracted as the edge points. As described in detail below, the threshold SH is varied between the lower limit and the upper limit prescribed in accordance with the surface condition of the all roads on which the own vehicle has ever run.

In step 106, a process is executed to determine, for each pixel of the one frame of the image that is picked up by the camera and input in step 100, whether the brightness variation is larger than the predetermined threshold SH set in step 104, whereby the edge points of the target constituting the lane-dividing line are extracted from the one frame of the image picked up by the camera using the predetermined threshold SH.

In step 108, a process is executed to connect plural of the edge points for the pixels extracted in step 106 together with lines on the right and left sides of the image and perform the line detection, pair determination, and continuity determination, whereby the linear edge lines are generated on the right and left sides of the image as final candidates for the lane-dividing line. Then, in step 110, the edge line generated according to the process result in step 108 is used as one representing the final lane-dividing line. Accordingly, the lateral position of the own vehicle relative to the lane-dividing line is detected and output to the automatic steering control device 16. Note that, in the process of step 110, if plural edge lines are generated on the right and left sides of the image according to the process result in step 108, the edge lines having the largest number of the edge points may be used as those representing the lane-dividing line.

Furthermore, after the candidates for the lane-dividing line are generated in step 108, a process in step 112 is executed to count the number of the generated candidates COUNT for the lane-dividing lines on the right and left sides in the image (namely, both sides of the road). Then, the following process is independently applied to the candidates for the lane-dividing lines on both sides of the road.

In step 114, it is determined whether the number of the candidates COUNT for the lane-dividing line counted in step 112 is less than the predetermined number COUNT0. The predetermined number COUNT0 is generally set equal to "1," because it is general practice that the predetermined number COUNT0 is the number of the lane-dividing lines to be drawn on one side of the lane on the road surface where vehicles run and is drawn on the one side of the lane as a single line. However, as described below, this predetermined number COUNT0 is set equal to a number greater than "1" (for example, two or three) if the vehicle runs on the road on which the lane-dividing line is drawn on one side of the lane as a composite line composed of two or three lines, which is frequently seen in Japan (for example, when it is detected by a navigation system that the own vehicle runs on the road on which the lane-dividing line is drawn as a composite line). Conversely, if the vehicle running on the road on which the lane-dividing line is drawn as a composite line transfers to a road on which the lane-dividing line is drawn as a general single line, the predetermined number is set equal to "1" again. Then, if the relationship COUNT<COUNT0 is not established as a result of the process in step 114, the process of step 116 is next executed.

In step 116, it is determined whether the reduction number of the edge points constituting the edge line finally generated as one representing the lane-dividing line in step 108 between the previous image and the present image is equal to or larger than a first predetermined value. The first predetermined value is, for example, a general reduction number of the edge points presumed when the brightness variation on the road surface is changed from a large value to a small value, for example, at the entrance of a tunnel, and it is experimentally prescribed. Note that a large brightness variation due to the existence of shade generated when the vehicle enters the tunnel is actually recognized from an area far from the own vehicle, i.e., from an upper part of the image picked up by the camera. Accordingly, the process of step 116 may determine whether the number of the edge points is largely reduced particularly at the upper area of the image reflecting an area far from the vehicle.

If the reduction number of the edge points is less than the first predetermined value as a result of the process in step 116, it can be determined that the vehicle runs on a normal road where the brightness is not largely reduced. Therefore, the process of step 118 is then executed. In step 118, it is determined whether the number of the candidates COUNT for the lane-dividing line counted in step 112 exceeds the predetermined number COUNT0. As a result, if it is determined that the relationship COUNT>COUNT0 is not established, it can be determined that a desired number of the candidates for the lane-dividing line are generated from the one frame of the input image. Then, the process of step 120 is executed.

In step 120, it is determined whether the increasing number of the edge points constituting the edge line finally generated as one representing the lane-dividing line in step 108 between the previous image and the present image is equal to or larger than a second predetermined value. The second predetermined value is, for example, a general increasing number of the edge points presumed when the brightness variation on the road surface is changed from a small value to a large value, for example, at the exit of the tunnel, and it is experimentally prescribed. Furthermore, the second predetermined value may be set equal to the same value as the first predetermined value. Note that a large brightness variation due to the absence of the shade generated when the vehicle comes out of the tunnel is actually recognized from an area far from the own vehicle, i.e., from an upper part of the image picked up by the camera. Accordingly, the process of step 120 may determine whether the number of the edge points is largely increased particularly at the upper area of the image reflecting the area far from the vehicle.

If the increasing number of the edge points is less than the second predetermined value as a result of the process in step 120, it can be determined that the vehicle runs on a normal road where the brightness is not largely increased. Therefore, the process of step 122 is then executed. In step 122, the process is executed to leave the predetermined threshold SH for the brightness variation used to extract the edge points of the target constituting the lane-dividing line as it is from the image picked up by the camera input in the next routine.

On the other hand, if the relationship COUNT<COUNT0 is established as a result of the process in step 114, it can be determined that the number of the candidates for the lane-dividing line generated from the one frame of the image input in step 100 is smaller than the desired number of the candidates for the lane-dividing line to be drawn on the road surface. Therefore, the process of step 124 is next executed.

In step 124, a process is executed to reduce the predetermined threshold SH for the brightness variation used to extract the edge points of the target constituting the lane-dividing line from the image picked up by the camera so as to be lower than the present value determined in step 104 by a predetermined amount. Note that the predetermined amount is set equal to a variation amount required for varying the threshold SH of the edge points at three or more steps including the lower limit and the upper limit.

When the process of step 124 is executed, the reduced predetermined threshold SH is used in the next routine as the predetermined threshold SH for the brightness variation used to extract the edge points of the target constituting the lane-dividing line from the image picked up by the camera input at that time (step 104). In this case, it becomes easy to generate the candidates for the lane-dividing line from the image picked up by the camera obtained at the next time (from the image picked up by the camera in the next frame).

Furthermore, in step 116, if it is determined that the reduction number of the edge points constituting the edge line finally generated as one representing the lane-dividing line is equal to or larger than the first predetermined value, it can be determined that the vehicle is running on the road, for example, at the entrance of a tunnel where the brightness variation is changed from a large value to a small value. Therefore, the process of step 126 is then executed.

In step 126, a process is executed to reduce the predetermined threshold SH for the brightness variation used to extract the edge points of the target constituting the lane-dividing line from the image picked up by the camera at a stroke so as to be lower than the present value determined in step 104 over the predetermined amount. Note that in this case an extent of reducing the predetermined threshold SH may be an amount exceeding at least the predetermined amount used in step 124, i.e., an amount reducing multiple times the predetermined amount rather than reducing stepwise the predetermined amount. That is, an amount twice or three times the predetermined amount or an amount making the threshold SH jump to the lower limit at a stroke may be used.

When the process of step 126 is executed, the reduced predetermined threshold SH is used in the next routine as the predetermined threshold SH for the brightness variation used to extract the edge points of the target constituting the lane-dividing line from the image picked up by the camera input at that time (step 104). In this case, it becomes further easier to generate the candidates for the lane-dividing line from the image picked up by the camera obtained at the next time.

Furthermore, if the relationship COUNT>COUNT0 is established as a result of the process in step 118, it can be determined that the number of the candidates for the lane-dividing line generated from the one frame of the image input in step 100 is larger than the desired number of the candidates for the lane-dividing line to be drawn on the road surface. Therefore, the process of step 128 is next executed.

In step 128, a process is executed to increase the predetermined threshold SH for the brightness variation used to extract the edge points of the target constituting the lane-dividing line from the image picked up by the camera so as to be higher than the present value determined in step 104 by a predetermined amount. Note that the predetermined amount is set equal to a variation amount required for varying the threshold SH of the edge points at three or more steps including the lower limit and the upper limit, and it may be set equal to the same value as the predetermined amount at the time of reducing the threshold SH.

When the process of step 128 is executed, the increased predetermined threshold SH is used in the next routine as the predetermined threshold SH for the brightness variation used to extract the edge points of the target constituting the lane-dividing line from the image picked up by the camera input at that time (step 104). In this case, it becomes difficult to generate the candidates for the lane-dividing line from the image picked up by the camera in the next frame.

Moreover, in step 120, if it is determined that the increasing number of the edge points constituting the edge line finally generated as one representing the lane-dividing line is equal to or larger than the second predetermined value, it can be determined that the vehicle is running on the road, for example, at the exit of a tunnel where the brightness variation is changed from a small value to a large value. Therefore, the process of step 130 is then executed.

In step 130, a process is executed to increase the predetermined threshold SH for the brightness variation used to extract the edge points of the target constituting the lane-dividing line from the image picked up by the camera at a stroke so as to be higher than the present value determined in step 104 over the predetermined amount. Note that in this case an extent of increasing the predetermined threshold SH may be an amount exceeding at least the predetermined amount used in step 128, i.e., an amount reducing multiple times the predetermined amount rather than increasing stepwise the predetermined amount. That is, an amount twice or three times the predetermined amount or an amount making the threshold SH jump to the upper limit at a stroke may be used.

When the process of step 130 is executed, the increased predetermined threshold SH is used in the next routine as the predetermined threshold SH for the brightness variation used to extract the edge points of the target constituting the lane-dividing line from the image picked up by the camera input at that time (step 104). In this case, it becomes more difficult to generate the candidates for the lane-dividing line from the image picked up by the camera in the next frame.

As described above, according to the routine shown in FIG. 3, every time the image picked up by the camera 12 is input, it is possible to change the predetermined threshold SH for the brightness variation used to extract the edge points of the target constituting the lane-dividing line from the image picked up by the camera by making use of the result of generating the edge lines as the final candidates for the lane-dividing line obtained through the line detection, pair determination, and continuity determination based on the edge points extracted from the image. Specifically, if the number of the final candidates for the lane-dividing line is smaller than the desired number, the threshold SH can be reduced to a low value so as to facilitate the extraction of the edge points and generate the edge lines. On the other hand, if the number of the candidates for the lane-dividing line is larger than the desired number, the threshold SH can be increased to a high value so as to increase difficulty in extracting the edge points and generate the edge lines.

According to this embodiment, when the predetermined threshold SH for the brightness variation used to extract the edge points of the target constituting the lane-dividing line from the image picked up by the camera is changed as described above, the changed predetermined threshold SH is used to extract the edge points from the image picked up by the camera 12 at the next time (the image picked up by the camera in the next frame).

According to the configuration of this embodiment, even if the number of the candidate lines for the lane-dividing line actually generated based on the edge points extracted from the image picked up by the camera once exceeds the predetermined number, the threshold SH for the brightness variation used to extract the edge points from the image picked up by the camera is changed to a high value so as to increase difficulty in extracting the edge points, thereby making it possible to eliminate the likelihood of extracting noise which does not represent the actual lane-dividing line as the edge points of the lane-dividing line as much as possible. Furthermore, even if the number of the candidate lines for the lane-dividing line actually generated based on the edge points extracted from the image picked up by the camera once does not reach the predetermined number, the threshold SH for the brightness variation used to extract the edge points from the image picked up by the camera is changed to a low value so as to facilitate the extraction of the edge points, thereby making it possible to eliminate the likelihood of causing the target representing the actual lane-dividing line not to be extracted as the edge line due, for example, to the fact that paint of the lane-dividing line is peeled and scraped as much as possible.

In this regard, according to the lane-dividing line detection device 10 of this embodiment, the edge points representing the lane-dividing line can be accurately extracted from the image picked up by the camera 12 while responding flexibly to road surface conditions so that the actual lane-dividing line can be reliably generated as the candidate line with the noise eliminated. Accordingly, it is possible to detect the lane-dividing line with high accuracy.

Furthermore, according to this embodiment, the change of the threshold SH for the brightness variation used to extract the edge points from the image picked up by the camera is reflected when the edge points are extracted from the image picked up by the camera in the next frame. In other words, the threshold SH for the brightness variation used to extract the edge points from the image picked up by the camera at a certain point is determined based on the number of the candidates for the lane-dividing line generated from the image picked up by the camera at the previous point. Therefore, according to this embodiment, it is not necessary to repeatedly perform an edge-point extraction process and an edge-line generation process plural times with respect to one input image picked up by the camera; it is sufficient to perform these processes once. As a result, it is possible to reduce the calculation cost, processing amount, and processing time associated with image processing for detecting the lane-dividing line from the one image picked up by the camera and reduce the image processing capability.

Note that, according to the configuration in which the change of the threshold SH is reflected when the edge points are extracted from the image picked up by the camera in the next frame, the application of the changed threshold SH is delayed by one frame. However, in general, because a condition such as scraping of the lane-dividing line drawn on the road surface is not largely changed between the frames of the image picked up by the camera, the delay of one frame when the threshold SH is applied is not so significant. Therefore, according to this embodiment, almost no problems occur when the application of the changed threshold SH is delayed by one frame.

Furthermore, according to this embodiment, the change (both reduction and increasing) of the threshold SH for the brightness variation used to extract the edge points from the image picked up by the camera is generally performed stepwise by a predetermined amount every time the image picked up by the camera is input. According to this configuration, the threshold SH for the brightness variation used to extract the edge points of the lane-dividing line from the image picked up by the camera can be increased stepwise if much noise exists in the image. On the other hand, it can be reduced stepwise if no lane-dividing line is detected. According to the lane-dividing line detection device 10 of this embodiment, it is possible to automatically converge the threshold SH into a proper value with which a desired number of the candidate lines can be generated while carefully responding to road surface conditions such as the degree of noise and the degree of scraping of the actual lane-dividing line, i.e., the value with which the lane-dividing line drawn on the road can be reliably detected with the noise eliminated from the image. Therefore, it is possible to detect the lane-dividing line with further high accuracy.

However, if the variation (time variation) of the number of the edge points per unit time in the image picked up by the camera is relatively large, it can be determined that the vehicle is running on the road, for example, at the entrance and exit of the tunnel where the degree (contrast) of the brightness variation is largely changed. Therefore, in order to properly detect the lane-dividing line from the image picked up by the camera, it is necessary to change the threshold SH immediately before or after being switched. According to this embodiment, as shown in FIG. 3, if the number of the edge points extracted for each image picked up by the camera largely varies with time between the previous routine and the present routine, the threshold SH is changed by an amount twice or three times the predetermined amount or changed to the lower or upper limit over the predetermined amount at a stroke, rather than changed stepwise by the predetermined amount. According to the configuration of this embodiment, even if the contrast of the road surface such as the entrance and exit of a tunnel is suddenly changed, it is possible to prevent long-term continuation of not detecting the lane-dividing line caused by the configuration in which the threshold SH is changed stepwise and extracting much unnecessary noise. Thus, it is possible to prevent the detection accuracy of the lane-dividing line from being degraded.

Moreover, according to this embodiment, the change of the predetermined threshold SH for the brightness variation used to extract the edge points of the target constituting the lane-dividing line from the image picked up by the camera is performed based on the number of the candidates for the lane-dividing line finally left in the image by connecting the plural edge points extracted from the image picked up by the camera together with a line and eliminating the noise to some extent through the line detection, pair determination, and continuity determination. With this configuration, the edge points, which represent the noise in the image picked up by the image and do not constitute the line, are generally excluded from the edge points of the target constituting the lane-dividing line through the line detection. Furthermore, even if noise exists in the line, the edge points caused by the noise are generally excluded from the edge points of the target constituting the lane-dividing line through the pair determination. Moreover, even if the noise edge points are aligned in pairs, the edge points caused by the noise are generally excluded from the edge points of the target constituting the lane-dividing line. Therefore, the existence of the edge points representing such noise hardly interferes with the generation of the candidates for the lane-dividing line and hardly affects the change of the predetermined threshold SH.

In other words, even if the edge point representing the noise exists, the edge point excluded through the line detection, pair determination, and continuity determination is not required for generating the final candidates for the lane-dividing line associated with the change of the predetermined threshold SH. Therefore, the unnecessary change of the predetermined threshold SH is prevented. According to this embodiment, it is thus possible to detect the lane-dividing line from the image picked up by the camera with high accuracy and stably.

Figure 4:
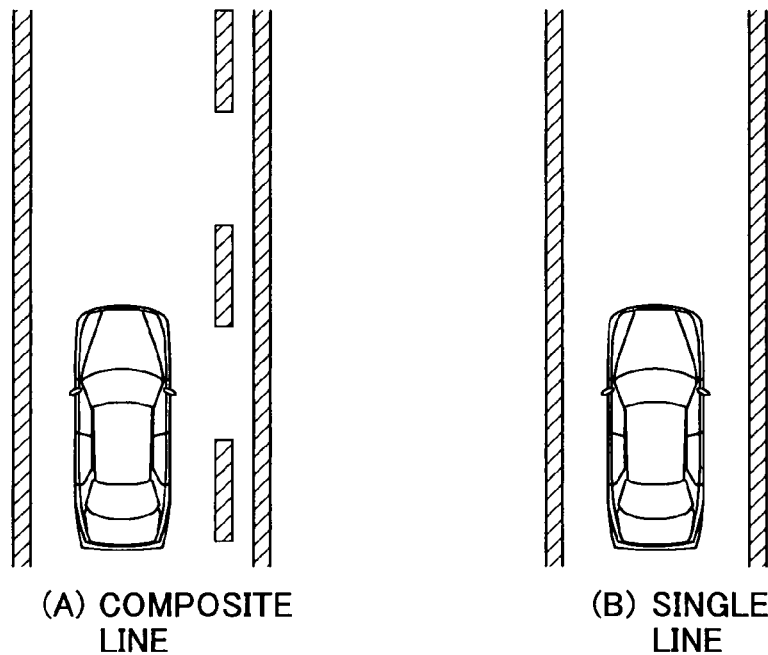
FIGS. 4A and 4B shows conditions in which the shapes of lane-dividing lines drawn on a road surface are a single line composed of one line and a composite line composed of plural lines, respectively.

Meanwhile, as the shape of the lane-dividing line drawn on one side on the road surface, a single line composed of one line as shown in FIG. 4B and a composite line composed of plural (two lines in FIG. 4A) lines as shown in FIG. 4A are provided. As described above, according to this embodiment, the threshold SH for the brightness variation used to extract the edge points of the lane-dividing line from the image picked up by the camera is controlled based on the number of the final candidates COUNT for the lane-dividing line. Specifically, if the number of the candidates COUNT for the lane-dividing line exceeds the predetermined number COUNT0, the threshold SH is increased to a high value. Accordingly, in the case of the composite line as the shape of the lane-dividing line, if the predetermined number COUNT0 is always set equal to "1," the threshold SH is caused to continue to increase. Conversely, if the predetermined number COUNT0 is always set equal to a number greater than "1," the noise is easily detected as the lane-dividing line when the vehicle is running on the single line.

Figure 5:
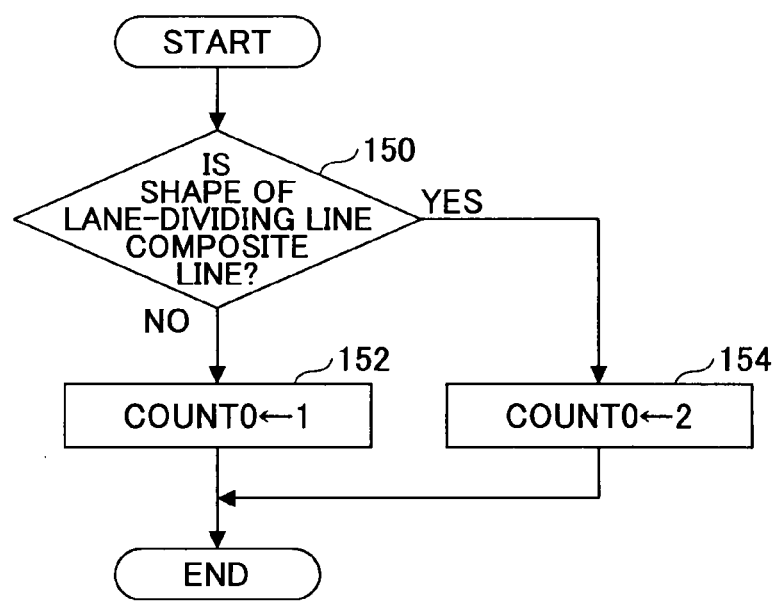
FIG. 5 shows a flowchart of an example of a sub-routine executed in the lane-dividing line detection device of this embodiment.

Accordingly, the lane-dividing line detection device 10 of this embodiment has a second characteristic in that it changes the predetermined number COUNT0 as the threshold of the candidates for the lane-dividing line in accordance with the shape of the lane-dividing line drawn on the road surface to prevent the above inconveniences. Referring to FIG. 5, a description is now made of a second characteristic part of this embodiment.

FIG. 5 shows a flowchart of an example of a sub-routine executed by the image processing unit 14 in the lane-dividing line detection device 10 of this embodiment. A routine shown in FIG. 5 is repeatedly activated every predetermined time. When the routine shown in FIG. 5 is activated, the process of step 150 is first executed.

In step 150, it is determined whether the shape of the lane-dividing line drawn on the road where the own vehicle is running is a composite line composed of the plural lines. This determination may be performed based on whether the position of the own vehicle on the road detected using a navigation system storing information of the shape of the lane-dividing line drawn on the road matches the position where the lane-dividing line is drawn as the composite line. Also, it may be performed based on whether it is determined that the lane-dividing line detected using the image picked up by the camera is composed of a composite line as a processing result of the image picked up by the camera 12.

If a negative result is obtained through step 150, it is determined that the shape of the lane-dividing line is the single line. Therefore, in the next step 152, a process is executed to set the predetermined number COUNT0 as the threshold of the candidates for the lane-dividing line equal to "1." After the process is executed, the determination of the number of the candidates COUNT for the lane-dividing line is made based on the predetermined number COUNT0 determined in steps 114 and 118 in the routine shown in FIG. 3.

On the other hand, if a positive result is obtained at step 150, it is determined that the shape of the lane-dividing line is a composite line composed of the plural lines. Therefore, in the next step 154, a process is executed to set the predetermined number COUNT0 as the threshold of the candidates for the lane-dividing line to equal "2." Note that the predetermined number COUNT0 set in this step is not limited to "2," but it may be the number (for example, "3" in the case of the composite line composed of three lines) corresponding to the number of the lane-dividing lines constituting the composite line. After the process is executed, the determination of the number of the candidates COUNT for the lane-dividing line is made based on the predetermined number COUNT0 determined in steps 114 and 118 in the routine shown in FIG. 3.

According to the routine shown in FIG. 5, the predetermined number COUNT0 as the threshold of the candidates for the lane-dividing line can be changed in accordance with the shape of the lane-dividing line actually drawn on the road surface. Specifically, if the shape of the lane-dividing line is a single line, the predetermined number COUNT0 is changed to "1" as a general number. On the other hand, if the shape of the lane-dividing line is a composite line, the predetermined number COUNT0 can be increased from "1" to a number greater than "1" (for example, "2").

With this configuration, when the number of the lane-dividing lines drawn on one side of the lane changes with time, specifically, even when the shape of the lane-dividing line changes from a single line to a composite line, it is possible to prevent the threshold SH for the brightness variation used to extract the edge points from the image picked up by the camera from continuing to increase. Conversely, even when the shape of the lane-dividing line changes from a composite line to a single line, it is possible to prevent noise from being easily detected as a lane-dividing line when the vehicle is running on the road. According to the lane-dividing line detection device 10 of this embodiment, the edge points can be thus extracted from the image picked up by the camera while responding flexibly to road surface conditions in which the shape of a lane-dividing line is changed, thereby making it possible to detect the lane-dividing line with high accuracy.

As described above, according to the system of this embodiment, the lane-dividing line can be detected with high accuracy. Therefore, it is possible to prevent the lateral position of the own vehicle from being calculated based on incorrect lane-dividing line information and prevent the lateral position of the own vehicle relative to the lane-dividing line from not being calculated at all. Thus, it is possible to properly and reliably execute the deviation preventing control that prevents the deviation of the own vehicle with the automatic steering control device 16 by using the actual lane-dividing line.

Meanwhile, in the above embodiment, the camera 12 corresponds to "pickup means" described in claims below, the brightness variation corresponds to a "predetermined parameter" described in the claims, the predetermined threshold SH corresponds to a "reference" described in the claims, the edge points correspond to "characteristic points" described in the claims, the predetermined number COUNT0 corresponds to a "predetermined number" described in the claims, and the predetermined amount associated with the predetermined threshold SH corresponds to a "predetermined unit" described in the claims.

Furthermore, in the above embodiment, the image processing unit 14 executes the process of step 106 in the routine shown in FIG. 3 to realize "characteristic point extraction means" described in the claims, executes the process of step 108 in the routine shown in FIG. 3 to realize "candidate line generation means" described in the claims, executes the processes of steps 122, 124, 126, 128, and 130 in the routine shown in FIG. 3 to realize "reference change means" described in the claims, and executes the processes of steps 152 and 154 in the routine shown in FIG. 5 to realize "predetermined number change means" described in the claims.

Note that, in the above embodiment, the number of the candidates for the lane-dividing line is used to change the predetermined threshold SH for the brightness variation used to extract the edge points of the target constituting the lane-dividing line from the image picked up by the camera, and the candidates for the lane-dividing line are generated by applying the line detection, pair determination, and continuity determination to the edge points extracted from the image picked up by the camera. However, the method of generating the candidates for the lane-dividing line is not limited to this, and other methods may be further added.

Furthermore, in the above embodiment, the predetermined threshold SH may be set to correspond to each of the lane-dividing lines on both right and left sides of the road so that the change of the threshold SH is independently applied. With this configuration, the threshold SH is independently changed based on the candidates for the lane-dividing line generated on both of the right and left sides of the image. Therefore, even if the lane-dividing line on the left side becomes light because it is exposed to the sunlight while the lane-dividing line on the right side becomes dark because it is not exposed to the sunlight, the threshold SH is properly set to correspond to each of the lane-dividing lines on the right and left sides. Accordingly, it is possible to accurately extract the edge points representing the lane-dividing line from the image picked up by the camera 12 while responding flexibly to road surface conditions. Moreover, it is possible to detect the lane-dividing line with high accuracy.

Furthermore, in the above embodiment, when the predetermined threshold SH is changed based on the number of the edge lines as the final candidates for the lane-dividing line actually generated from the image picked up by the camera, the changed predetermined threshold SH is applied when the edge points are extracted from the image picked up by the camera the next time (the image picked up by the camera in the next frame). However, the present invention is not limited to this, and the changed predetermined threshold SH may be applied when the edge points are extracted from the image picked up by the camera at the time after the next or the subsequent time.

Furthermore, in order to detect and presume the lane-dividing line to be output to the automatic steering control device 16, the changed predetermined threshold SH may be used to extract the edge points again from the original image picked up by the camera used to calculate the number of the final candidates for the lane-dividing line. Similarly to the configuration of the above embodiment, the configuration of this modified embodiment makes it possible to obtain the effect of accurately extracting the edge points representing the lane-dividing line from the image picked up by the camera while responding flexibly to road surface conditions so that the actual lane-dividing line can be reliably generated as the candidate line with the noise eliminated. In this modified embodiment. However, it is necessary to perform the edge-point extraction process and the edge-line generation twice or more times for each image picked up by the camera with different thresholds, in addition to storing all data of the image picked up by the camera 12 in a memory as a buffer. Therefore, the image processing amount becomes enormous, requiring a high-throughput image processing capability.

Furthermore, in the above embodiment, the threshold SH used to extract the edge points is immediately changed when the number of the candidates COUNT for the lane-dividing line generated from the one-frame image picked up by the camera is less than the predetermined number COUNT0 or exceeds the predetermined number COUNT0. However, the threshold SH may be changed when the number of the candidates COUNT for the lane-dividing line generated from the image picked up by the camera is less than the predetermined number COUNT0, or where the number of the candidates COUNT exceeding the predetermined number COUNT0 continues over a prescribed number of frames or continues for a predetermined time period.

Furthermore, in the above embodiment, the brightness variation as the difference between high brightness and low brightness is used as a parameter to extract the edge points of the target constituting the lane-dividing line from the image picked up by the camera. However, brightness itself may be used as the parameter.

Moreover, in the above embodiment, the detected and presumed lane-dividing line serves as the reference for calculating the lateral position of the own vehicle and is used for automatic steering of the vehicle to prevent the own vehicle in distance from deviating from the lane-dividing line. However, the present invention is not limited to this, and the lane-dividing line may be used to perform alarming and warning control that informs the vehicle driver through a speaker output and a display output when the own vehicle is about to deviate in distance from the lane-dividing line. Furthermore, the lane-dividing line may be used to perform control for switching a lighting direction so as to light a headlight along the lane-dividing line while the vehicle is running.

The present application is based on Japanese Priority Application No. 2006-82812, filed on Mar. 24, 2006, the entire contents of which are hereby incorporated by reference.

The invention claimed is:

1. A lane-dividing line detection device that has pickup means for picking up a road surface around a vehicle and characteristic point extraction means for extracting a part where a predetermined parameter meets a reference from an image picked up by the pickup means as a characteristic point representing a lane-dividing line on the road surface and detects the lane-dividing line drawn on a road based on the characteristic point extracted by the characteristic point extraction means, the lane-dividing line detection device comprising:

candidate line generation means for generating a candidate line for the lane-dividing line based on the characteristic point extracted by the characteristic point extraction means;

reference change means for changing the reference on the predetermined parameter used when the characteristic point extraction means extracts the characteristic point from the image so as to facilitate an extraction of the characteristic point when the number of the candidate lines generated by the candidate line generation means does not reach a predetermined number; and predetermined number change means for changing the predetermined number in accordance with a number of the lane-dividing lines drawn on one side of the road.

2. The lane-dividing line detection device according to claim 1, wherein the predetermined number change means increases the predetermined number when a shape of the lane-dividing line drawn on the one side of the road is changed from a single line composed of one line to a composite line composed of plural lines.

3. The lane-dividing line detection device according to claim 1, wherein the reference change means changes the reference on the predetermined parameter used when the characteristic point extraction means extracts the characteristic point from the image at next and subsequent times.

4. The lane-dividing line detection device according to claim 1, wherein the predetermined parameter represents brightness or a brightness variation.

5. The lane-dividing line detection device according to claim 1, wherein the reference change means changes the reference stepwise by a predetermined unit.

6. The lane-dividing line detection device according to claim 5, wherein the reference change means changes the reference by an amount greater than the predetermined unit at a stroke when a time variation of the number of the characteristic points extracted by the characteristic point extraction means is equal to or larger than a predetermined value.

7. A lane-dividing line detection device that has pickup means for picking up a road surface around a vehicle and characteristic point extraction means for extracting a part where a predetermined parameter meets a reference from an image picked up by the pickup means as a characteristic point representing a lane-dividing line on the road surface and detects the lane-dividing line drawn on a road based on the characteristic point extracted by the characteristic point extraction means, the lane-dividing line detection device comprising:

candidate line generation means for generating a candidate line for the lane-dividing line based on the characteristic point extracted by the characteristic point extraction means;

reference change means for changing the reference on the predetermined parameter used when the characteristic point extraction means extracts the characteristic point from the image so as to increase difficulty in extracting the characteristic point when the number of the candidate lines generated by the candidate line generation means exceeds a predetermined number; and predetermined number change means for changing the predetermined number in accordance with a number of the lane-dividing lines drawn on one side of the road.

8. The lane-dividing line detection device according to claim 7, wherein the predetermined number change means increases the predetermined number when a shape of the lane-dividing line drawn on the one side of the road is changed from a single line composed of one line to a composite line composed of plural lines.

9. The lane-dividing line detection device according to claim 7, wherein the reference change means changes the reference on the predetermined parameter used when the characteristic point extraction means extracts the characteristic point from the image at next and subsequent times.

10. The lane-dividing line detection device according to claim 7, wherein the predetermined parameter represents brightness or a brightness variation.

11. The lane-dividing line detection device according to claim 7, wherein the reference change means changes the reference stepwise by a predetermined unit.

12. The lane-dividing line detection device according to claim 11, wherein the reference change means changes the reference by an amount greater than the predetermined unit at a stroke when a time variation of the number of the characteristic points extracted by the characteristic point extraction means is equal to or larger than a predetermined value.

13. A lane-dividing line detection device that has pickup means for picking up a road surface around a vehicle and characteristic point extraction means for extracting a part where a predetermined parameter meets a reference from an image picked up by the pickup means as a characteristic point representing a lane-dividing line on the road surface and detects the lane-dividing line drawn on a road based on the characteristic point extracted by the characteristic point extraction means, the lane-dividing line detection device comprising:

candidate line generation means for generating a candidate line for the lane-dividing line based on the characteristic point extracted by the characteristic point extraction means;

reference change means for changing the reference on the predetermined parameter used when the characteristic point extraction means extracts the characteristic point from the image so as to facilitate the extraction of the characteristic point when the number of the candidate lines generated by the candidate line generation means does not reach a predetermined number and changes the reference so as to increase difficulty in extracting the characteristic point when the number of the candidate lines generated by the candidate line generation means exceeds the predetermined number; and predetermined number change means for changing the predetermined number in accordance with a number of the lane-dividing lines drawn on one side of the road.

14. The lane-dividing line detection device according to claim 13, wherein the predetermined number change means increases the predetermined number when a shape of the lane-dividing line drawn on the one side of the road is changed from a single line composed of one line to a composite line composed of plural lines.

15. The lane-dividing line detection device according to claim 13, wherein the reference change means changes the reference on the predetermined parameter used when the characteristic point extraction means extracts the characteristic point from the image at next and subsequent times.

16. The lane-dividing line detection device according to claim 13, wherein the predetermined parameter represents brightness or a brightness variation.

17. The lane-dividing line detection device according to claim 13, wherein the reference change means changes the reference stepwise by a predetermined unit.

18. The lane-dividing line detection device according to claim 17, wherein the reference change means changes the reference by an amount greater than the predetermined unit at a stroke when a time variation of the number of the characteristic points extracted by the characteristic point extraction means is equal to or larger than a predetermined value.

19. A lane-dividing line detection device for determining a lane-dividing line from image data of a road surface around a vehicle, comprising:
- an image processor having a routine which extracts a part of the image data where a predetermined parameter meets a reference threshold to identify one or more characteristic points in image data on the lane-dividing line of the road surface;
- said routine when executed generating one or more candidate lines for the lane-dividing line based on the characteristic points;
- said routine when executed changing the reference threshold when a number of the candidate lines generated does not reach a predetermined number to decrease difficulty in extracting the characteristic point and changing the reference threshold when the number of the candidate lines generated exceeds the predetermined number to increase said difficulty in extracting the characteristic point; and
- said routine when executed changing the predetermined number in accordance with a number of the lane-dividing lines drawn on one side of the road.

* * * * *